US011665764B1

(12) United States Patent
Marupaduga et al.

(10) Patent No.: US 11,665,764 B1
(45) Date of Patent: May 30, 2023

(54) DYNAMICALLY DETERMINE OPTIMAL 5G NEW RADIO CONFIGURATION FOR DUAL RADIO ACCESS TECHNOLOGY CAPABLE USER DEVICES

(71) Applicant: T-MOBILE INNOVATIONS LLC, Overland Park, KS (US)

(72) Inventors: Sreekar Marupaduga, Overland Park, KS (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 23 days.

(21) Appl. No.: 17/357,316

(22) Filed: Jun. 24, 2021

(51) Int. Cl.
*H04W 76/16* (2018.01)
*H04W 28/08* (2023.01)
*H04W 28/02* (2009.01)
*H04W 8/24* (2009.01)

(52) U.S. Cl.
CPC ............. *H04W 76/16* (2018.02); *H04W 8/24* (2013.01); *H04W 28/0268* (2013.01); *H04W 28/095* (2020.05)

(58) Field of Classification Search
None
See application file for complete search history.

(56) References Cited

U.S. PATENT DOCUMENTS

| 2019/0053115 A1* | 2/2019 | Ngai | H04W 36/14 |
| 2021/0289430 A1* | 9/2021 | Hwang | H04W 60/00 |
| 2022/0030417 A1* | 1/2022 | Carames | H04W 28/24 |

FOREIGN PATENT DOCUMENTS

| WO | WO2021242247 | * | 5/2020 |
| WO | WO2022035566 | * | 7/2021 |
| WO | WO2022083260 | * | 8/2021 |

* cited by examiner

*Primary Examiner* — Mohammad S Adhami
(74) *Attorney, Agent, or Firm* — Shook, Hardy & Bacon L.L.P.

(57) ABSTRACT

Systems and methods are provided for dynamically determining optimal 5G New Radio (NR) configuration for dual Radio Access Technology (RAT) technology capable user equipment (UE). After receiving an indication a UE has connected to a particular sector, an eNodeB having a nonstandalone (NSA) 5G node and a standalone (SA) 5G node requests historical information or geotagged data corresponding to the UE. The eNodeB determines a NSA signal quality for a 5G node of the eNodeB and a SA signal quality of the 5G SA node. Based on a delta of the NSA signal quality and the SA signal quality being below a predetermined threshold, the eNodeB uses the historical information or the geotagged data to dynamically assign the UE to the NSA 5G node or the SA 5G node.

20 Claims, 5 Drawing Sheets

DYNAMICALLY DETERMINE OPTIMAL 5G NEW RADIO CONFIGURATION FOR DUAL RADIO ACCESS TECHNOLOGY CAPABLE USER DEVICES

SUMMARY

Embodiments of the technology described herein are directed to, among other things, systems and methods for dynamically determining optimal 5G New Radio (NR) configuration for dual Radio Access Technology (RAT) technology capable user equipment (UE). To do so, upon receiving an indication a UE has connected to a particular sector, an eNodeB having a nonstandalone (NSA) 5G node and a standalone (SA) 5G node requests historical information or geotagged data corresponding to the UE. The eNodeB determines a NSA signal quality for a 5G node of the eNodeB and a SA signal quality of the 5G SA node. Based on a delta of the NSA signal quality and the SA signal quality being below a predetermined threshold, the eNodeB uses the historical information or the geotagged data to dynamically assign the UE to the NSA 5G node or the SA 5G node.

In aspects, the eNodeB monitors application information corresponding to the UE to generate the historical information. The application information may comprise non-guaranteed bit rate (non-GBR) quality of service class identifiers (QCI). In some aspects, the eNodeB assigns the UE to the NSA 5G node if the count of non-GBR QCIs for the UE is greater than an operator defined threshold. In other aspects, eNodeB assigns the UE to the SA 5G node if the count of non-GBR QCIs for the UE is less than an operator defined threshold.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
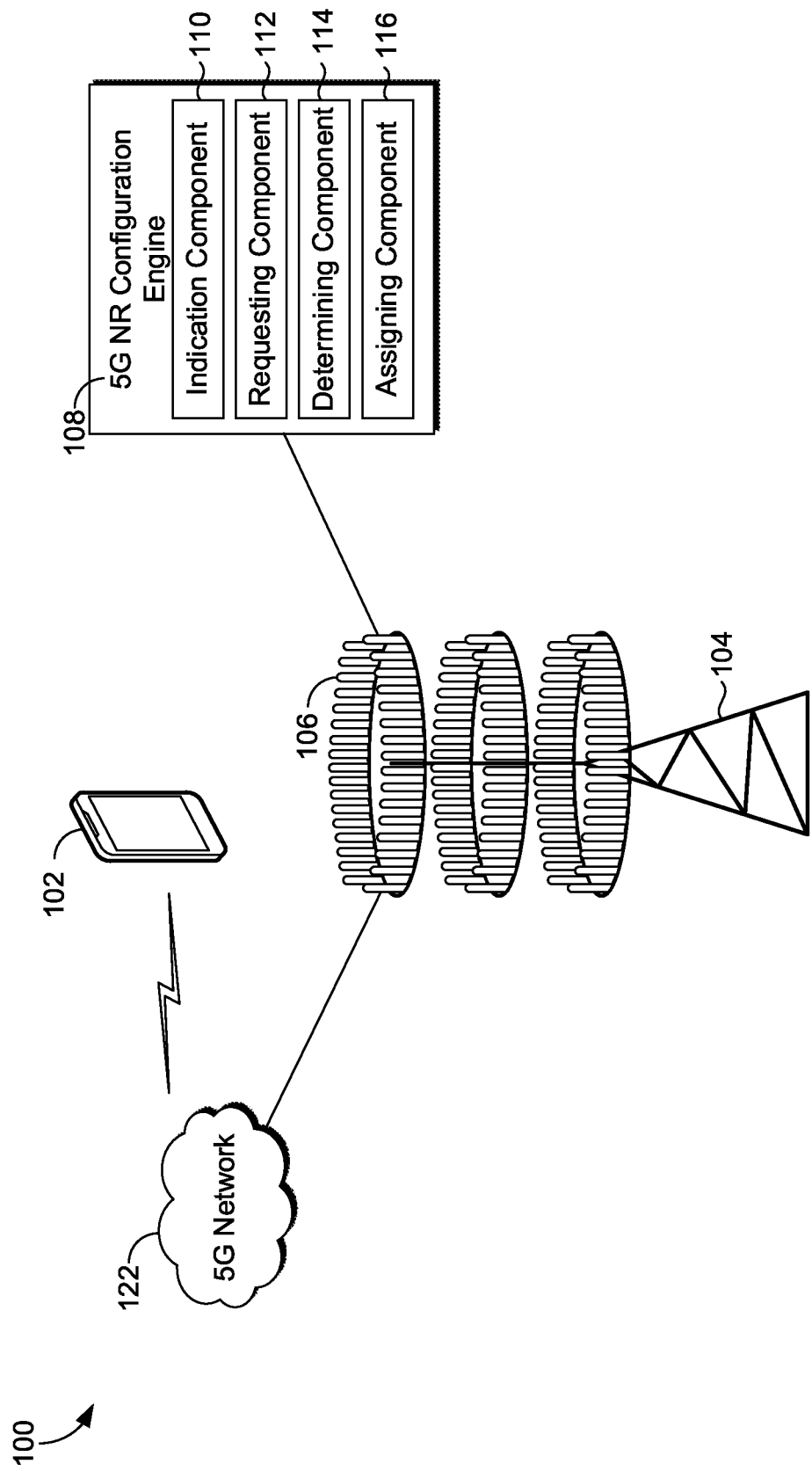
FIG. 1 is a diagram of an example network environment, in accordance with some aspects of the technology described herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
NSA Nonstandalone
OOBE Out-of-Band-Emission
PC Personal Computer
PCS Personal Communications Service
PDA Personal Digital Assistant
RAM Random Access Memory
RAT Radio Access Technology
RET Remote Electrical Tilt
RF Radio-Frequency
RFI Radio-Frequency Interference
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SA Standalone
SINR Signal-to-Interference-Plus-Noise Ratio
SNR Transmission-to-noise ratio
SON Self-Organizing Networks
TDMA Time Division Multiple Access
TXRU Transceiver (or Transceiver Unit)

UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, mMIMO/5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

The present disclosure is directed to systems, methods, and computer readable media that dynamically determine optimal 5G NR configuration for dual RAT technology capable UE. To do so, upon receiving an indication a UE has connected to a particular sector, an eNodeB having a NSA 5G node and a SA 5G node requests historical information or geotagged data corresponding to the UE. The eNodeB determines a NSA signal quality for a 5G node of the eNodeB and a SA signal quality of the 5G SA node. Based on a delta of the NSA signal quality and the SA signal quality being below a predetermined threshold, the eNodeB uses the historical information or the geotagged data to dynamically assign the UE to the NSA 5G node or the SA 5G node.

Certain operators have deployed 5G networks as a hybrid of NSA and SA architectures with overlapping coverage. By way of example, consider a 5G network scenario with overlapping coverage of both NSA and SA implemented on different bands. A UE attached to a NSA 5G node can benefit from higher peak data speeds. In contrast the same UE attached to a SA 5G node can benefit from higher quality/coverage for voice and emergency services. However, UEs capable of supporting both architectures are not being leveraged to provide service effectively depending on service type because conventional systems do not dynamically assign the UE to a NSA 5G node or a SA 5G node depending on application type. The present disclosure dynamically determines optimal NR configuration for UEs based on historical UE application and/or geotagged UE data over a period of time. In this way, a UE may be proactively assigned to a SA 5G node due to its historical GBR application type which conserves LTE and NR resources on a NSA 5G node and improves end user experience.

In aspects, the eNodeB monitors application information corresponding to the UE to generate the historical information. The application information may comprise non-guaranteed bit rate (non-GBR) quality of service class identifiers (QCI). In some aspects, the eNodeB assigns the UE to the NSA 5G node if the count of non-GBR QCIs for the UE is greater than an operator defined threshold. In other aspects, eNodeB assigns the UE to the SA 5G node if the count of non-GBR QCIs for the UE is less than an operator defined threshold.

According to aspects of the technology described herein, a method for dynamically determining optimal 5G NR configuration for dual RAT technology capable user equipment UE is provided. The method comprises receiving an indication, at an eNodeB having a NSA 5G node, that a UE has connected to a particular sector. The method also comprises requesting, by the eNodeB, historical information corresponding to the UE. The method further comprises determining a NSA signal quality for a 5G node of the eNodeB and a SA signal quality of a 5G SA node. The method also comprises, based on a delta of the NSA signal quality and the SA signal quality being below a predetermined threshold, using the historical information to dynamically assign, by the eNodeB, the UE to the NSA 5G node or the SA 5G node.

According to further aspects of the technology described herein, one or more computer-readable media having computer-executable instructions embodied thereon that, when executed by at least one computing device, cause the computing device to perform operations for dynamically determining optimal 5G NR configuration for dual RAT technology capable UE. The operations comprise receiving an indication, at an eNodeB having a NSA 5G node, that a UE has connected to a particular sector. The operations also comprise requesting, by the eNodeB, geotagged UE data corresponding to the UE. The operations further comprise determining a NSA signal quality for the NSA 5G node of the eNodeB and a SA signal quality of a SA 5G node. The operations also comprise, based on a delta of the NSA signal quality and the SA signal quality being below a predetermined threshold, using the geotagged UE data to dynamically assign, by the eNodeB, the UE to the NSA 5G node or the SA 5G node.

According to even further aspects of the technology described herein, a system for dynamically determining optimal 5G NR configuration for dual RAT technology capable UE is provided. The system one or more UEs. The system also comprises an eNodeB having a NSA 5G node and a SA 5G node. The eNodeB, upon receiving an indication a UE of the one or more UEs has connected to a particular sector, requests historical information or geotagged data corresponding to the UE. The eNodeB also determines a NSA signal quality for a 5G node of the eNodeB and a SA signal quality of the 5G SA node. The eNodeB further, based on a delta of the NSA signal quality and the SA signal quality being below a predetermined threshold, uses the historical information or the geotagged data to dynamically assign the UE to the NSA 5G node or the SA 5G node.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 5:
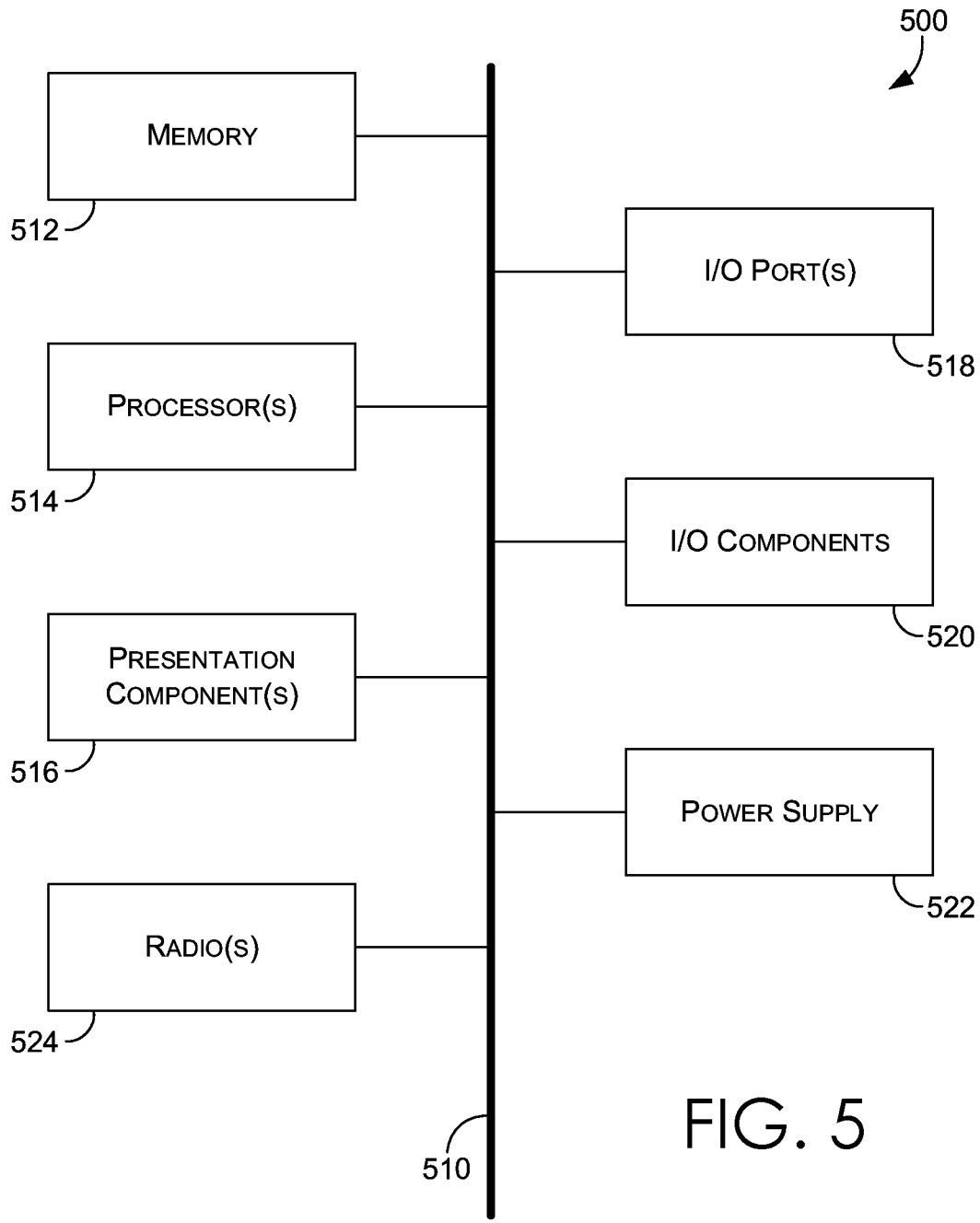
FIG. 5 depicts an example computing environment suitable for use in implementation of the present disclosure.

A network cell may comprise a base station to facilitate wireless communication between a communications device within the network cell, such as communications device 500 described with respect to FIG. 5, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 512 in FIG. 5 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include a 5G NR Configuration Engine 108. The 5G NR Configuration Engine 108 may be configured to, among other things, dynamically determining optimal 5G NR configuration for dual RAT technology capable UE in accordance with the present disclosure. Though 5G NR Configuration Engine 108 is illustrated as a component of base station 104 in FIG. 1, it may be a standalone device (e.g., a server having one or more processors), a service provided via the 5G network 122, or may be remotely located.

As mentioned, the 5G NR Configuration Engine 108 may facilitate determining optimal 5G NR configuration for dual RAT technology capable UE, such as UE 102. The 5G NR Configuration Engine 108 may include, among other things, indication component 110, requesting component 112, determining component 114, and assigning component 116. The 5G NR Configuration Engine 108 may receive, among other things, data from user devices, such as UE 102, within a network cell associated with a particular base station 104. Additionally or alternatively, the 5G NR Configuration Engine 108 may receive, among other things, data from base station 104. The data received by the 5G NR Configuration Engine 108 comprises location information or geotagged data, application information, historical information, or a combination thereof.

Indication component 110 generally receives an indication that a UE has connected to a particular sector corresponding to one or more antennas of an eNodeB having a nonstandalone (NSA) 5G node. In embodiments, the indication component 110 and/or the eNodeB determines the UE is capable of supporting NSA 5G and SA 5G networks. Moreover, the indication components 110 and or the eNodeB may also determine the NSA 5G node and the SA 5G node are providing overlapping coverage for the UE.

Requesting component 112 generally requests historical information corresponding to the UE 102. The historical information may comprise historical application information corresponding to the UE 102. In response to the request, the requesting component 112 and/or the eNodeB receives historical information from a core network. In aspects, the indicating component 112 and/or the eNodeB monitors application information corresponding to the UE 102 to generate the historical information. In some aspects, the indicating component 112 and/or the eNodeB monitors the application information for a defined period of time. In other aspects, the requesting component 112 and/or the eNodeB monitors the application information for a defined number of application counts.

Additionally or alternatively, the requesting component 112 and/or the eNodeB requests geotagged UE data corresponding to the UE 102. The geotagged UE data may be utilized by the requesting component 112 and/or the eNodeB, in addition to or instead of the historical information, in various aspects, to dynamically assign the UE 102 to the NSA 5G node or the SA 5G node. In some aspects, the requesting component 112 and/or the eNodeB receives the geotagged UE data corresponding to the UE 102 from a core network or a component of the core network. In some aspects, when a UE 102 connects to a particular sector, the UE 102 may report a latitude and longitude to the indicating component and/or the eNodeB.

In other aspects, the requesting component 112 and/or the eNodeB may use a triangulation method to pinpoint the exact location of the UE 102 in a given sector. Accordingly, and in either aspect, the requesting component 112 and/or the eNodeB may assign usage information with a location. In this way, UE data may be tagged indicating that certain services are utilized by a particular user in specific locations within a sector. Similarly, UE data may be tagged indicating that certain services are utilized by a particular user at a specific time of day and/or day of the week. In aspects, the requesting component 112 and/or the eNodeB stores such UE data in call detail records (CDRs).

Determining component 114 generally determines a NSA signal quality for a 5G node of the eNodeB and a SA signal quality of a 5G standalone (SA) node. Based on a delta of the NSA signal quality and the SA signal quality being below a predetermined threshold, the assigning component 116 and/or the eNodeB utilizes historical information to dynamically assign the UE to the NSA 5G node or the SA 5G node. In some aspects, the application information comprises non-GBR QCIs. The UE 102 may be assigned to the NSA 5G node if the count of non-GBR QCIs for the UE is greater than an operator defined threshold. On the other hand, the UE may be assigned to the SA 5G node if the count of non-GBR QCIs for the UE is less than an operator defined threshold.

Figure 2:
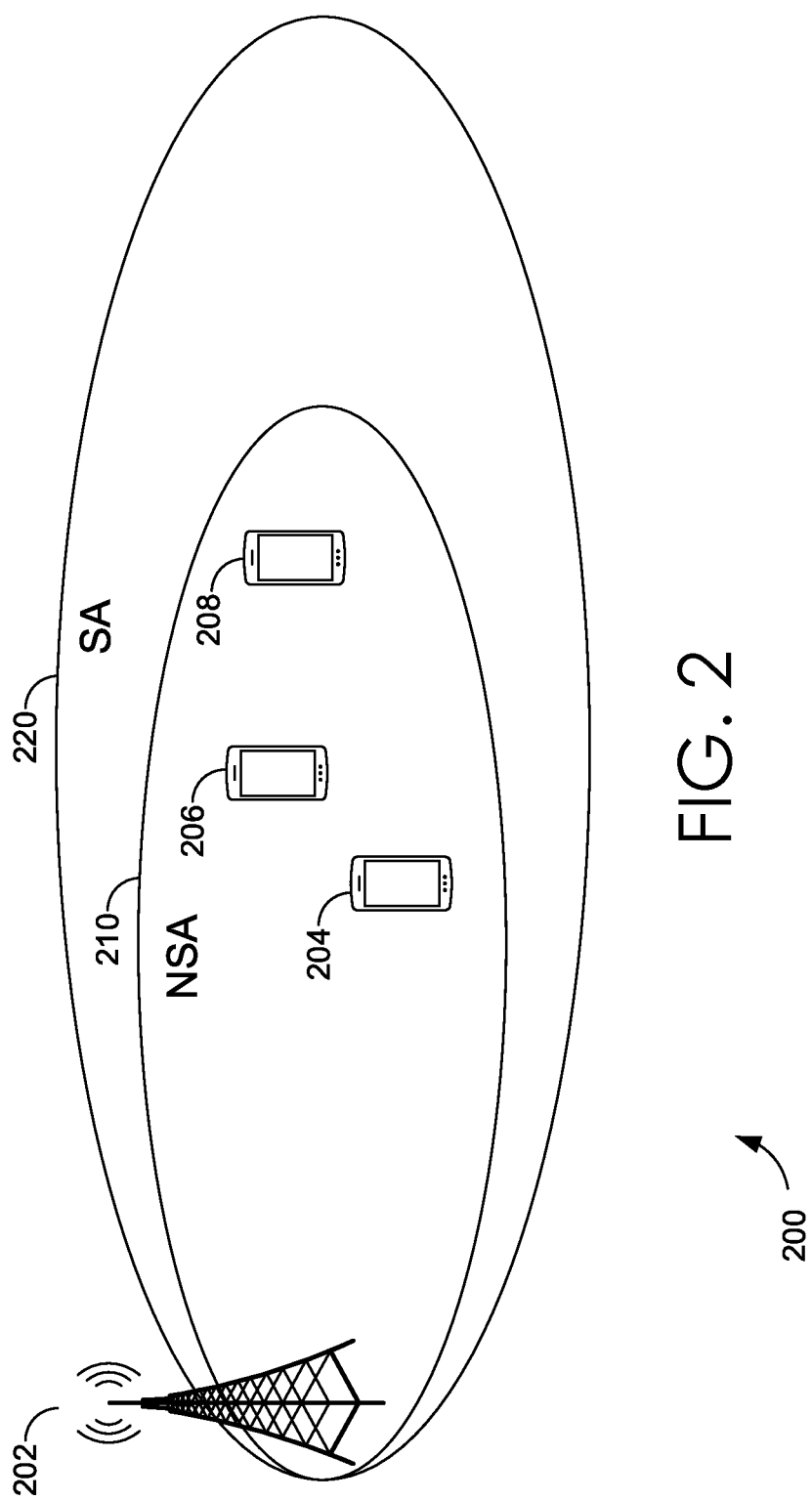
FIG. 2 is a diagram of an example operating environment, in accordance with some aspects of the technology described herein.

For illustrative purposes only, FIG. 2 provides an example of UEs 204, 206, 208 being provided overlapping NSA 5G 210 and SA 5G 220 coverage by base station 202. Now assume that base station 202 has determined each of the UEs 204, 206, 208 is capable of supporting NSA 5G 210 and SA 5G 220 networks. The base station 202 may request or begin monitoring application information corresponding to the UE to generate the historical information. The base station 202 may monitor the application information for a defined period of time or for a defined number of application counts.

Additionally or alternatively, the base station 202 requests geotagged UE data corresponding to each of the UEs 204, 206, 208. The geotagged UE data may indicate that certain services are utilized by a particular user in specific locations within a sector. Similarly, UE data may be tagged indicating that certain services are utilized by a particular user at a specific time of day and/or day of the week.

The base station 202 determines a NSA signal quality for a 5G node and a SA signal quality of a 5G SA node. Based on a delta of the NSA signal quality and the SA signal quality being below a predetermined threshold, the base station 202 utilizes historical information to dynamically assign each of the UEs 204, 206, 208 to the NSA 5G 210 node or the SA 5G 220 node. For example, UE 204 be assigned to the NSA 5G 210 node if the count of non-GBR QCIs for the UE 204 is greater than an operator defined threshold. In contrast, UE 206 may be assigned to the SA 5G 220 node if the count of non-GBR QCIs for the UE 206 is less than an operator defined threshold. Additionally or alternatively, the base station 202 may utilize geotagged UE data to dynamically assign each of the UEs 204, 206, 208 to the NSA 5G 210 node or the SA 5G 220 node.

Figure 3:
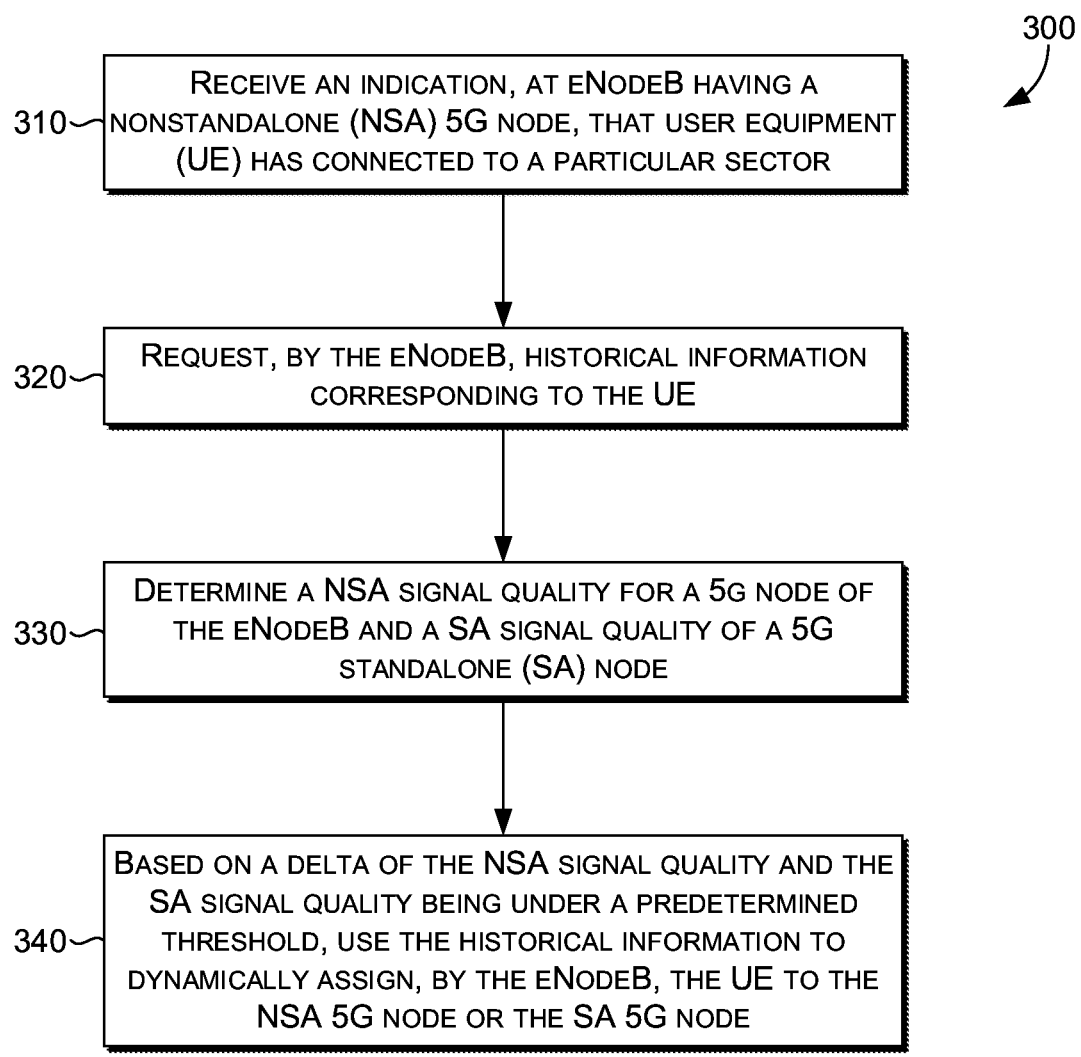
FIG. 3 is a flow diagram showing an example method of dynamically determining, utilizing historical information corresponding to the UE, optimal 5G NR configuration for dual RAT technology capable UE, in accordance with some aspects of the technology described herein.

Referring to FIG. 3, a flow diagram is provided showing a method 300 of dynamically determining, utilizing historical information corresponding to the UE, optimal 5G NR configuration for dual RAT technology capable UE, according to the technology described herein. Although the steps are illustrated as being performed in a particular order, it is contemplated that the steps may occur in any order or in combination with each other. Initially, at step 310, an indication is received at an eNodeB having a NSA 5G node indicating that a UE has connected to a particular sector. In embodiments, the eNodeB determines the UE is capable of supporting NSA 5G and SA 5G networks. Moreover, the eNodeB may also determine the NSA 5G node and the SA 5G node are providing overlapping coverage for the UE.

At step 320, the eNodeB requests historical information corresponding to the UE. The historical information may comprise historical application information corresponding to the UE. In response to the request, the eNodeB receives historical information from a core network. In aspects, the eNodeB monitors application information corresponding to the UE to generate the historical information. In some aspects, the eNodeB monitors the application information for a defined period of time. In other aspects, the eNodeB monitors the application information for a defined number of application counts.

A NSA signal quality for a 5G node of the eNodeB and a SA signal quality of a 5G standalone (SA) node is determined at step 330. Based on a delta of the NSA signal quality and the SA signal quality being below a predetermined threshold, the eNodeB utilizes historical information, at step 340, to dynamically assign the UE to the NSA 5G node or the SA 5G node. In some aspects, the application information comprises non-GBR QCIs. The UE may be assigned to the NSA 5G node if the count of non-GBR QCIs for the UE is greater than an operator defined threshold. On the other hand, the UE may be assigned to the SA 5G node if the count of non-GBR QCIs for the UE is less than an operator defined threshold.

Additionally or alternatively, the eNodeB requests geotagged UE data corresponding to the UE. The geotagged UE data may be utilized by the eNodeB, in addition to or instead of the historical information, in various aspects, to dynamically assign the UE to the NSA 5G node or the SA 5G node. In some aspects, the eNodeB receives the geotagged UE data corresponding to the UE from a core network or a component of the core network. In some aspects, when a UE connects to a particular sector, the UE may report a latitude and longitude to the eNodeB or gNodeB (although the eNodeB is primarily referenced while describing aspects of the invention, it is contemplated and within the scope of the invention that an eNodeB or an gNodeB may be used interchangeably while performing aspects of the invention described herein).

In other aspects, the eNodeB or gNodeB may use a triangulation method to pinpoint the exact location of the UE in a given sector. Accordingly, and in either aspect, the eNodeB may assign usage information with a location (i.e., geotagging usage information). In this way, UE data may be tagged indicating that certain services are utilized by a particular user in specific locations within a sector. Similarly, UE data may be tagged indicating that certain services are utilized by a particular user at a specific time of day and/or day of the week. In aspects, the eNodeB stores such UE data in call detail records (CDRs).

Figure 4:
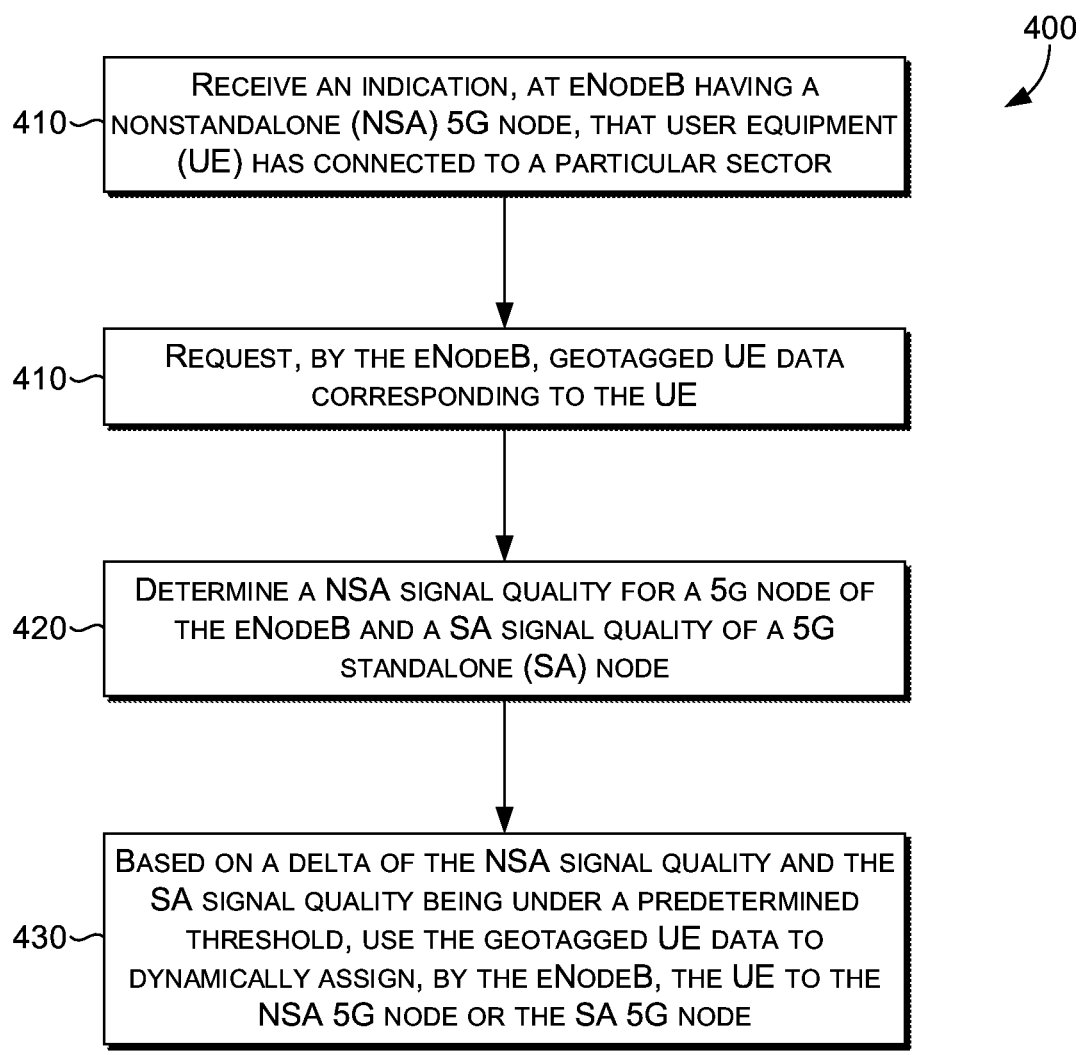
FIG. 4 is a flow diagram of an example method for dynamically determining, utilizing UE geotagged data, optimal 5G NR configuration for dual RAT technology capable UE, in accordance with some aspects of the technology described herein.

Referring to FIG. 4, a flow diagram is provided depicting a method for dynamically determining, utilizing UE geotagged data, optimal 5G NR configuration for dual RAT technology capable UE, according to aspects of the technology described herein. Initially, at step 410, an indication is received at an eNodeB having a NSA 5G node indicating that a UE has connected to a particular sector. In aspects, the eNodeB determines the UE is capable of supporting NSA 5G and SA 5G networks. In some aspects, the eNodeB determines the NSA 5G node and the SA 5G node are providing overlapping coverage for the UE.

At step 420, the eNodeB requests geotagged UE data corresponding to the UE. In some aspects, the eNodeB receives the geotagged UE data corresponding to the UE from a core network or a component of the core network. In some aspects, when a UE connects to a particular sector, the UE may report a latitude and longitude to the eNodeB or gNodeB (although the eNodeB is primarily referenced while describing aspects of the invention, it is contemplated and within the scope of the invention that an eNodeB or an gNodeB may be used interchangeably while performing aspects of the invention described herein).

In other aspects, the eNodeB or gNodeB may use a triangulation method to pinpoint the exact location of the UE in a given sector. Accordingly, and in either aspect, the eNodeB may assign usage information with a location (i.e., geotagging usage information). In this way, UE data may be tagged indicating that certain services are utilized by a particular user in specific locations within a sector. Similarly, UE data may be tagged indicating that certain services are utilized by a particular user at a specific time of day and/or day of the week. In aspects, the eNodeB stores such UE data in call detail records (CDRs).

A NSA signal quality for the NSA 5G node of the eNodeB and a SA signal quality of a SA 5G node is determined at step 430. Based on a delta of the NSA signal quality and the SA signal quality being below a predetermined threshold, the eNodeB utilizes the geotagged UE data, at step 440, to dynamically assign the UE to the NSA 5G node or the SA 5G node.

Additionally or alternatively, the eNodeB requests historical information corresponding to the UE. The eNodeB may utilize the historical information to dynamically assign the UE to the NSA 5G node or the SA 5G node. In some aspects, eNodeB may receive SA information via a centralized server, via typical network management servers deployed in operator networks, or via a direct connection between the eNodeB and the gNodeB.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and nonvolatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for dynamically determining optimal 5G New Radio (NR) configuration for dual Radio Access Technology (RAT) technology capable user equipment (UE), the method comprising:
   receiving an indication, at an eNodeB having a nonstandalone (NSA) 5G node, that a UE has connected to a particular sector;
   requesting, by the eNodeB, historical information corresponding to the UE;
   determining a NSA signal quality for a 5G node of the eNodeB and a SA signal quality of a 5G standalone (SA) node; and
   based on a delta of the NSA signal quality and the SA signal quality being below a predetermined threshold, using the historical information to dynamically assign, by the eNodeB, the UE to the NSA 5G node or the SA 5G node.

2. The method of claim 1, wherein the historical information comprises historical application information corresponding to the UE.

3. The method of claim 1, further comprising determining the UE is capable of supporting NSA 5G and SA 5G networks.

4. The method of claim 1, further comprising, in response to the requesting, receiving, at the eNodeB, historical information from a core network.

5. The method of claim 1, further comprising determining the NSA 5G node and the SA 5G node are providing overlapping coverage for the UE.

6. The method of claim 1, further comprising monitoring, at the eNodeB, application information corresponding to the UE to generate the historical information.

7. The method of claim 6, wherein the monitoring occurs at the eNodeB for a defined period of time.

8. The method of claim 6, wherein the monitoring occurs at the eNodeB for a defined number of application counts.

9. The method of claim 6, wherein the application information comprises non-guaranteed bit rate (non-GBR) quality of service class identifiers (QCI).

10. The method of claim 9, further comprising assigning the UE to the NSA 5G node if the count of non-GBR QCIs for the UE is greater than an operator defined threshold.

11. The method of claim 6, further comprising assigning the UE to the SA 5G node if the count of non-GBR QCIs for the UE is less than an operator defined threshold.

12. The method of claim 1, further comprising requesting, by the eNodeB, geotagged UE data corresponding to the UE.

13. The method of claim 12, further comprising using the geotagged UE data to dynamically assign, by the eNodeB, the UE to the NSA 5G node or the SA 5G node.

14. One or more non-transitory computer-readable media having computer-executable instructions embodied thereon that, when executed by at least one computing device, cause the computing device to perform operations for dynamically determining optimal 5G New Radio (NR) configuration for dual Radio Access Technology (RAT) technology capable user equipment (UE), the operations comprising:

receiving an indication, at an eNodeB having a nonstandalone (NSA) 5G node, that UE has connected to a particular sector;

requesting, by the eNodeB, geotagged UE data corresponding to the UE;

determining a NSA signal quality for the NSA 5G node of the eNodeB and a SA signal quality of a standalone (SA) 5G node; and based on a delta of the NSA signal quality and the SA signal quality being below a predetermined threshold, using the geotagged UE data to dynamically assign, by the eNodeB, the UE to the NSA 5G node or the SA 5G node.

15. The one or more non-transitory computer-readable media of claim 14, comprising determining the UE is capable of supporting NSA 5G and SA 5G networks.

16. The one or more non-transitory computer-readable media of claim 15, further comprising, in response to the requesting, receiving, at the eNodeB, geotagged UE data corresponding to the UE from a core network.

17. The one or more non-transitory computer-readable media of claim 14, further comprising determining the NSA 5G node and the SA 5G node are providing overlapping coverage for the UE.

18. The one or more non-transitory computer-readable media of claim 14, requesting, by the eNodeB, historical information corresponding to the UE.

19. The one or more non-transitory computer-readable media of claim 18, further comprising using the historical information to dynamically assign, by the eNodeB, the UE to the NSA 5G node or the SA 5G node.

20. A system for dynamically determining optimal 5G New Radio (NR) configuration for dual Radio Access Technology (RAT) technology capable user equipment (UE), the system comprising:

one or more UEs; and an eNodeB having a nonstandalone (NSA) 5G node and a standalone (SA) 5G node, wherein the eNodeB:

(1) upon receiving an indication a UE of the one or more UEs has connected to a particular sector, requests historical information or geotagged data corresponding to the UE;

(2) determines a NSA signal quality for a 5G node of the eNodeB and a SA signal quality of the 5G SA node; and (3) based on a delta of the NSA signal quality and the SA signal quality being below a predetermined threshold, uses the historical information or the geotagged data to dynamically assign the UE to the NSA 5G node or the SA 5G node.

* * * * *